(12) United States Patent
Ogawa et al.

(10) Patent No.: US 7,764,052 B2
(45) Date of Patent: Jul. 27, 2010

(54) VOLTAGE ADJUSTING CIRCUIT, AND MOTORCYCLE INCLUDING VOLTAGE ADJUSTING CIRCUIT

(75) Inventors: Kazuhiro Ogawa, Shizuoka (JP); Nobuhiko Maehashi, Shizuoka (JP); Ryou Kitamura, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 586 days.

(21) Appl. No.: 11/736,469

(22) Filed: Apr. 17, 2007

(65) Prior Publication Data
US 2007/0241565 A1 Oct. 18, 2007

(30) Foreign Application Priority Data
Apr. 17, 2006 (JP) ............................. 2006-113261

(51) Int. Cl.
*H02P 9/00* (2006.01)
*H02P 11/00* (2006.01)

(52) U.S. Cl. .......................... 322/44; 322/28; 290/40 B

(58) Field of Classification Search ............... 290/40 R, 290/40 B; 322/24, 28, 44; 180/218; 361/91.1, 361/56
See application file for complete search history.

(56) References Cited

U.S. PATENT DOCUMENTS

| | | | | |
|---|---|---|---|---|
| 4,569,009 A | * | 2/1986 | Genuit | 363/28 |
| 4,799,126 A | * | 1/1989 | Kruse et al. | 361/101 |
| 5,089,766 A | * | 2/1992 | Iwatani | 322/25 |
| 5,581,130 A | * | 12/1996 | Boucheron | 307/10.1 |
| 5,869,907 A | * | 2/1999 | Marler | 307/10.1 |
| 5,949,147 A | * | 9/1999 | McGrath et al. | 307/10.1 |
| 6,731,486 B2 | * | 5/2004 | Holt et al. | 361/91.1 |
| 7,162,656 B2 | * | 1/2007 | Vogman | 713/340 |
| 7,274,543 B2 | * | 9/2007 | Nishikawa et al. | 361/56 |
| 2004/0130906 A1 | * | 7/2004 | Arakawa et al. | 362/506 |
| 2007/0285861 A1 | * | 12/2007 | Kim | 361/91.3 |
| 2008/0012542 A1 | * | 1/2008 | Liu et al. | 323/271 |
| 2009/0116158 A1 | * | 5/2009 | Graves et al. | 361/86 |

FOREIGN PATENT DOCUMENTS

| | | |
|---|---|---|
| EP | 811763 A2 * | 12/1997 |
| JP | 06-141457 | 5/1994 |
| JP | 09-324732 | 12/1997 |
| JP | 10-201125 | 7/1998 |
| JP | 2004-350441 | 12/2004 |

* cited by examiner

Primary Examiner—Julio Gonzalez
(74) Attorney, Agent, or Firm—Rabin & Berdo, PC

(57) ABSTRACT

A voltage adjusting circuit prevents damage to an electrical component having no over-voltage protecting circuit when a battery is removed. An LED tail light is connected to an over-voltage protecting circuit of a CDI unit. Electric power is supplied from a power supply control section to the CDI unit and is also supplied to the LED tail light through the over-voltage protecting circuit. Thereby, the over-voltage protecting circuit of the CDI unit protects the LED tail light from an over-voltage condition.

14 Claims, 5 Drawing Sheets

[FIG. 1]

FIG. 3
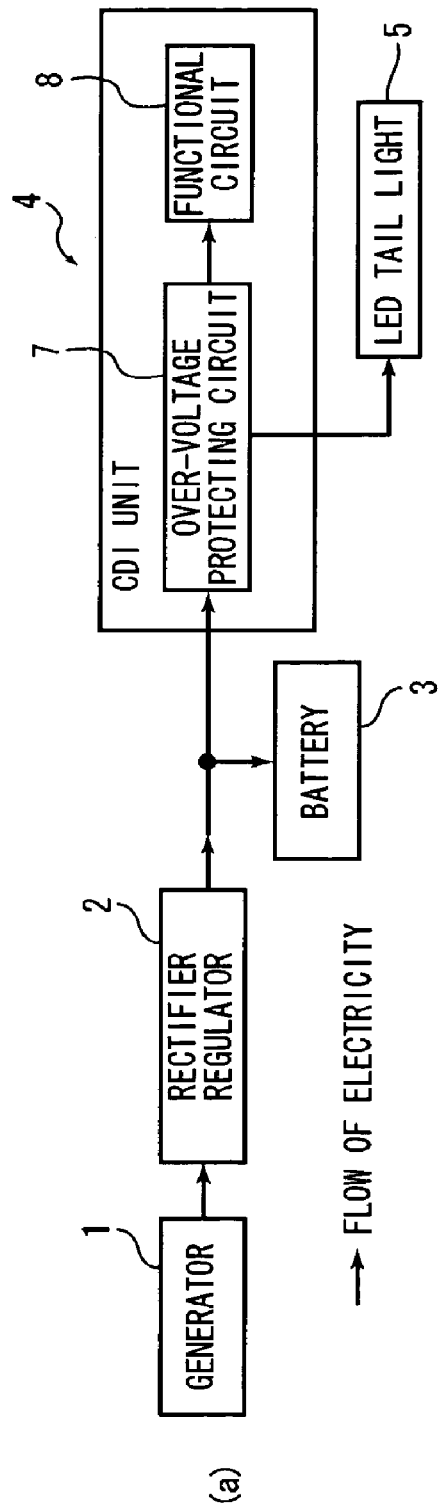
(a)
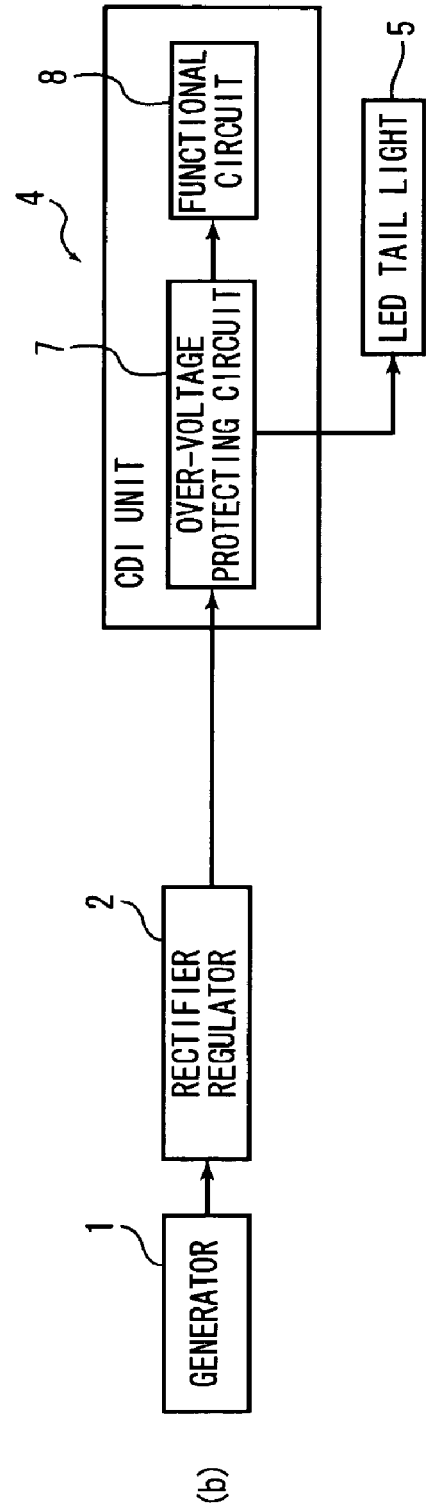
(b)

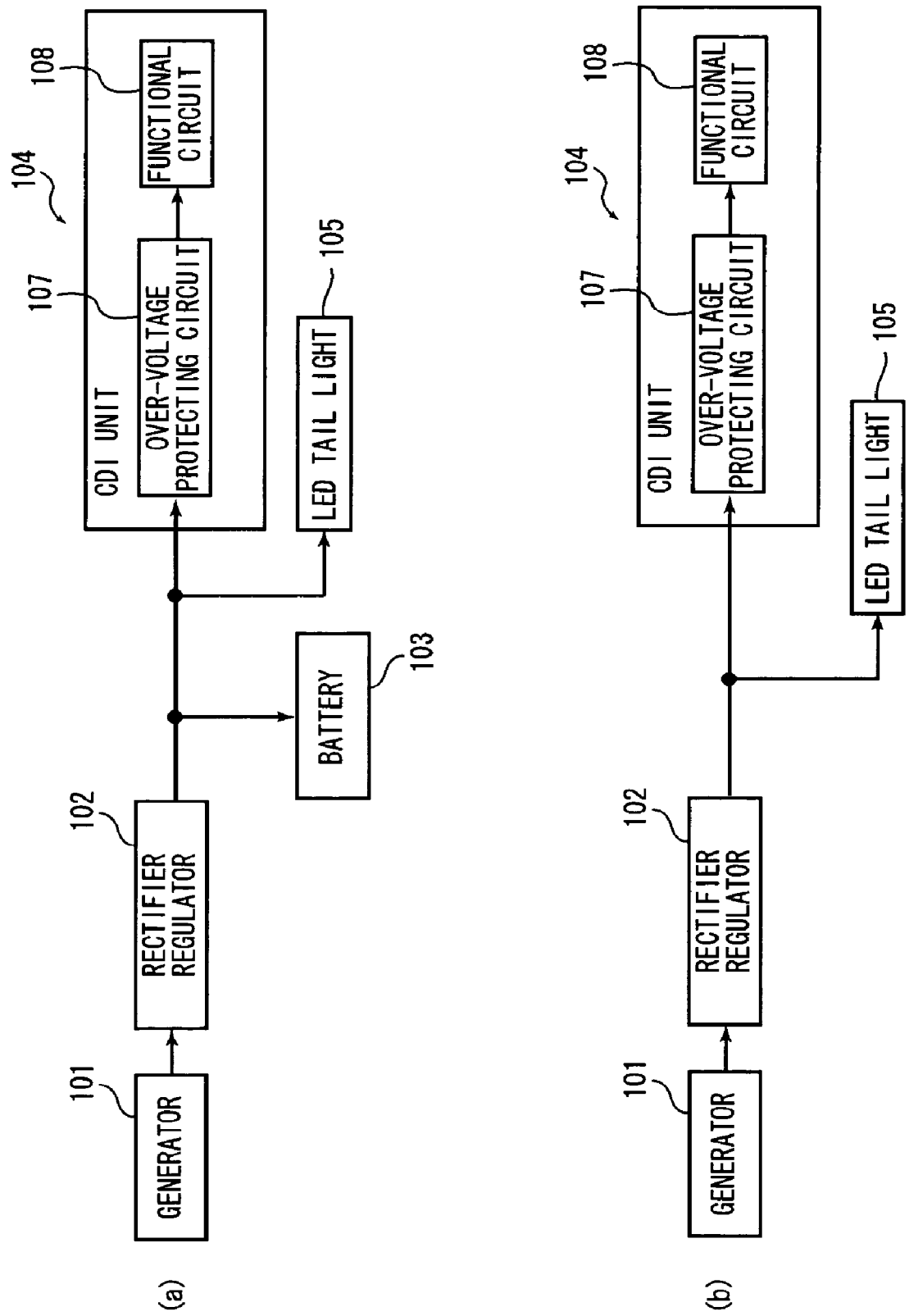

VOLTAGE ADJUSTING CIRCUIT, AND MOTORCYCLE INCLUDING VOLTAGE ADJUSTING CIRCUIT

RELATED APPLICATIONS

This application claims the benefit of priority under 35 USC 119 of Japanese patent application no. 2006-113261, filed on Apr. 17, 2006, which application is hereby incorporated by reference in its entirety.

BACKGROUND OF THE INVENTION

1. Field of the Invention

The present invention relates to a voltage adjusting circuit for a motorcycle including an electrical component having an over-voltage protecting circuit and another electrical component having no over-voltage protecting circuit.

2. Description of Related Art

Conventionally, as shown in FIGS. 4 and 5, a power supply device for a vehicle such as a motorcycle includes a generator 101, a power supply control section (rectifier/regulator) 102 for rectifying electricity outputted from generator 101 and for regulating voltage thereof and a battery 103 detachably connected to power supply control section 102. A first electrical component, for example, a CDI unit 104 having an over-voltage protecting circuit 107 and a functional circuit 108, and a second electrical component having no over-voltage protecting circuit, for example, a tail light unit having an LED tail light 105, LED stop light 109 and a stop switch 106 are connected to battery 103. In this power supply device, generator 101 generates electric power and power supply control section 102 rectifies electricity and regulates voltage to supply the power, as shown in FIG. 5(a), to CDI unit 104 and the tail light unit while charging battery 103. When stop switch 106 closes because a rider operates a brake lever or pedal (not shown), LED stop light 109 is turned on.

In some situations, the engine is started with a kick starter with battery 103 removed, such as when weight reduction is required as used for races, or when battery 103 cannot be exchanged for a new one due to economical reasons in regions such as Southeast Asia. If battery 103 is thus removed, power supply control section 102 directly supplies power to CDI unit 104, LED tail light 105 and so forth without any charge function since battery 103 is removed, as shown in FIG. 5(b).

As a device relating to this kind of conventional art, JP-A-Hei 9-324732 (pages 2 and 3, FIG. 1) proposes an ignition control device that stops power supply to the battery and load devices when a supply voltage from a generator is lower than a preset value at a moment of engine ignition. If the battery malfunctions, sufficient ignition voltage is supplied only by a kick starter.

JP-A-2004-350441 (pages 4 and 5, FIG. 1) proposes a power supply circuit that charges a battery using a first coil and supplies the electric power necessary for engine control loads using only a second coil. Under an insufficient charge condition of the battery, sufficient electric power is supplied to the engine control loads only by a kick starter.

JP-B-3210101 (page 2, FIG. 2) proposes a constant voltage circuit for a magnet type AC generator that has an over-voltage preventing circuit that prevents an over-voltage output of a magnet type AC generator from being applied to loads such as electronic equipment.

JP-B-3660456 (page 3, FIG. 1) proposes a voltage adjusting circuit for a motorcycle-use generator that has means for preventing an over-voltage from being applied to loads connected to battery terminals in parallel to a battery even in situations such as when the battery accidentally comes off.

However, in the conventional art shown in FIGS. 4 and 5 and described above, if battery 103 is removed so that the motorcycle is used without the charge function, the regulation can delay because of the characteristic of power control section 102 and over-voltage can be applied to CDI unit 104, LED tail light 105 and so forth. Thus, the second electrical component, i.e., the tail light unit including LED tail light 105 and LED stop light 109, which has no over-voltage protecting circuit, can be damaged. LED parts such as LED tail light 105 in particular are weak against over-voltage and easily damaged. Similarly, JP-A-Hei 9-324732 and JP-A-2004-350441 do not assume that the motorcycle is used with the battery removed and thus the same problem can arise.

The over-voltage preventing circuits of JP-B-3210101 and JP-B-3660456 are formed with thyristors, resistors and capacitors. Thus, these circuits have the disadvantages of increased number of parts and costs.

SUMMARY OF THE INVENTION

The present invention provides a voltage adjusting circuit that prevents damage to an electrical component having no over-voltage protecting circuit with a simple structure even though a battery is removed in a use state, thereby improving reliability of the electrical component without increasing costs.

A voltage adjusting circuit according to one embodiment of the invention includes a generator driven by an engine; a power supply control section for rectifying electricity outputted from the generator and for regulating voltage thereof; and a detachable battery. A first electrical component has an over-voltage protecting circuit and is connected to and receives electrical power from the power supply control section. A second electrical component has no over-voltage protecting circuit, and is connected to and receives electrical power from the over-voltage protecting circuit of the first electrical component.

Accordingly, if a battery is removed in a use state, the electric power is supplied to the second electrical component from the power supply control section through the over-voltage protecting circuit of the first electrical component, thereby preventing damage to the second electrical component and improving its reliability without increasing costs.

In one embodiment, the voltage adjusting circuit according includes a CDI unit for controlling ignition of the engine.

In another embodiment, the second electrical component includes an LED lamp.

In a further embodiment, the LED lamp includes an LED tail light.

According to the present invention, even though the motorcycle is used with a battery removed, damage to an electrical component having no over-voltage protecting circuit, particularly an LED part such as the LED tail light, is prevented by a simple structure. Accordingly, the voltage adjusting circuit improves the reliability of the electrical component without increasing costs.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIGS. 3(a) and 3(b) are block diagrams showing the flow of electricity in the voltage adjusting circuit of FIG. 2.

FIGS. 5(a) and 5(b) are block diagrams showing the flow of electricity in the conventional voltage adjusting circuit of FIG. 4.

DETAILED DESCRIPTION OF THE INVENTION

Figure 1:
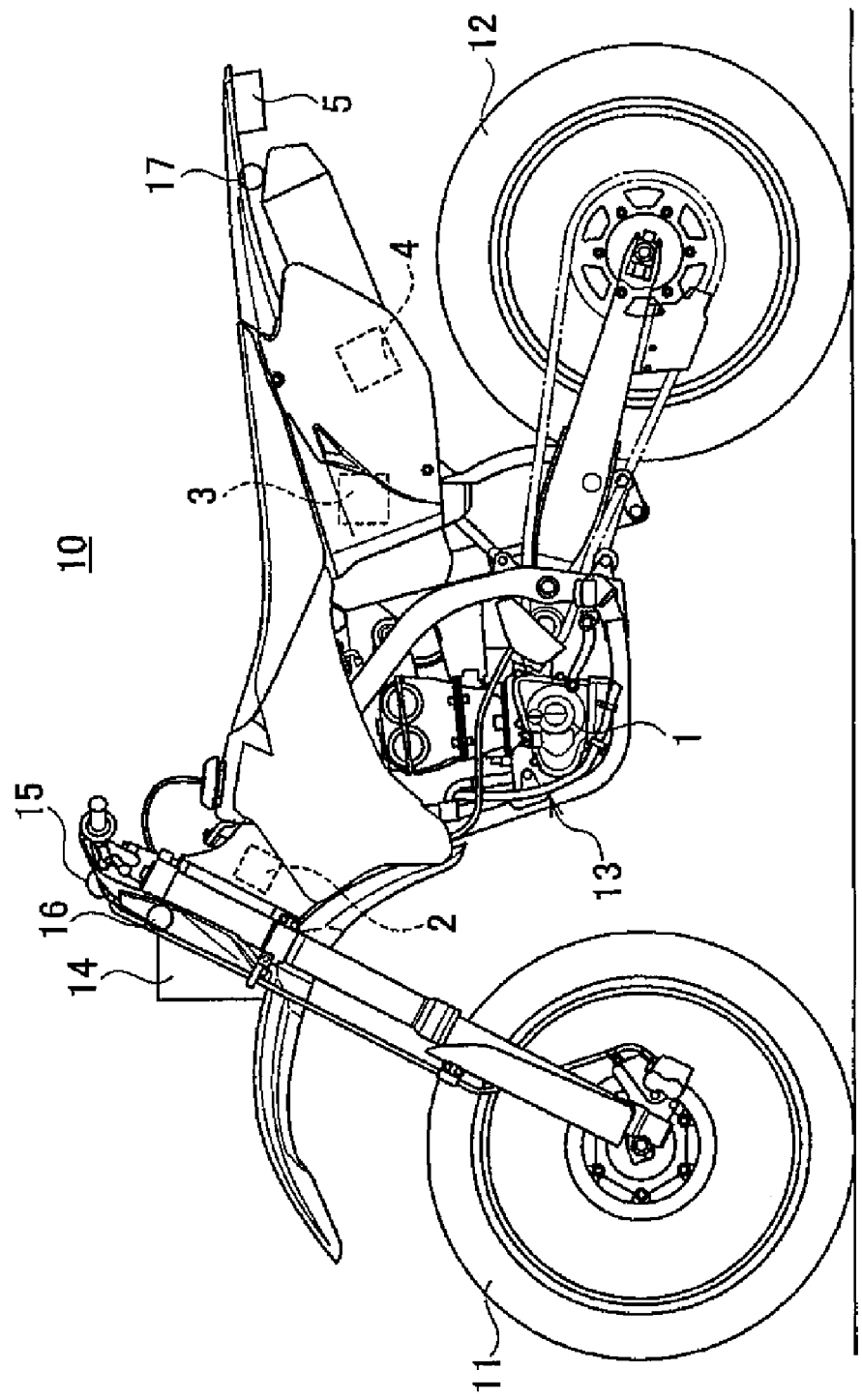
FIG. 1 is a left side view of a motorcycle according to an embodiment of the present invention.
Figure 2:
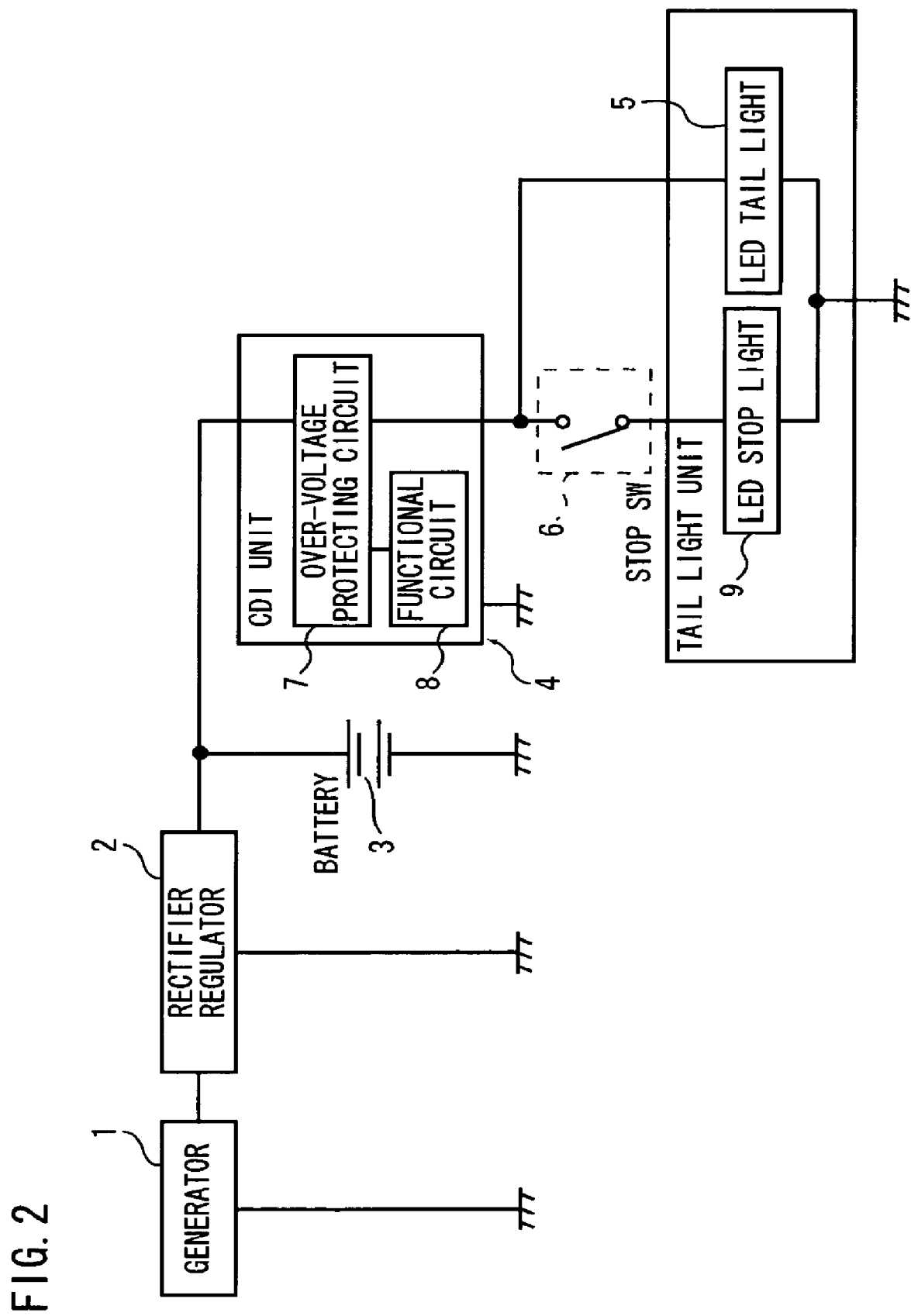
FIG. 2 is an electrical circuit diagram of a voltage adjusting circuit in the motorcycle of FIG. 1.
Figure 4:
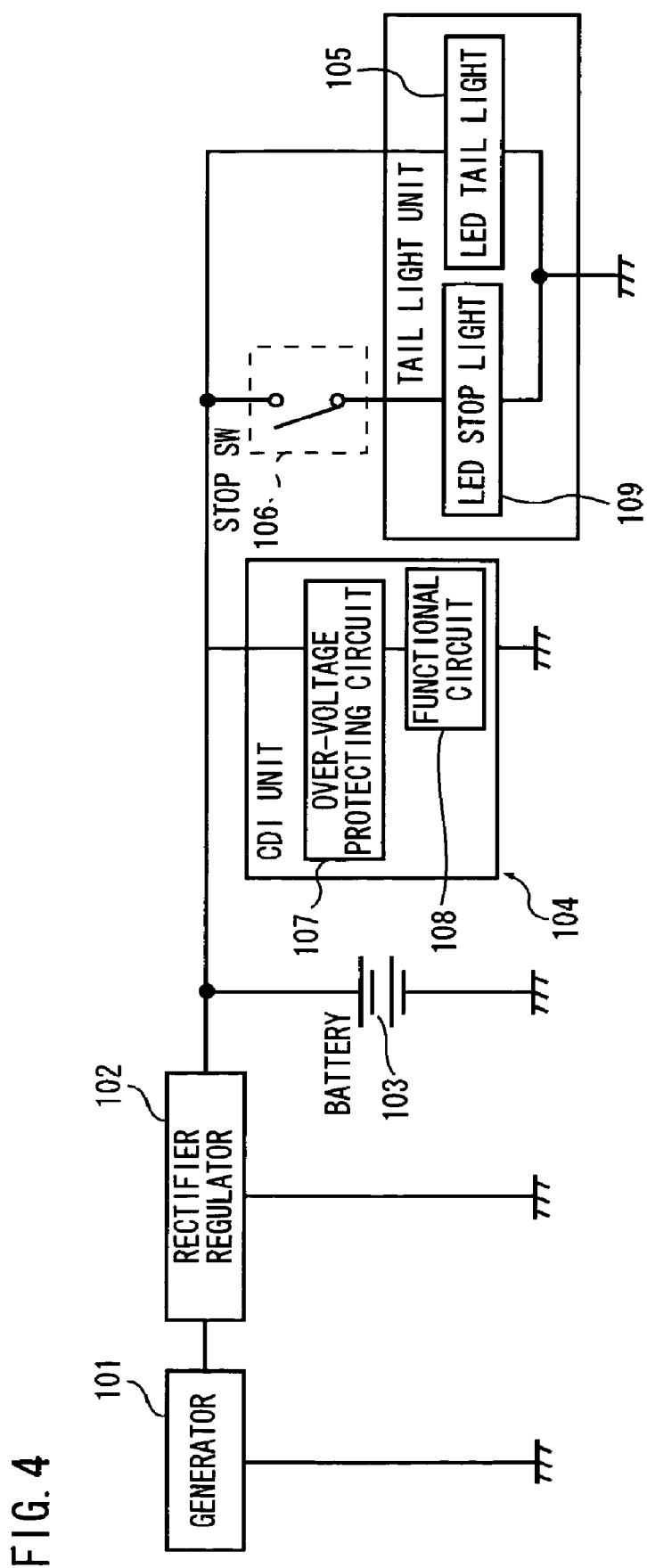
FIG. 4 is an electrical circuit diagram of a conventional voltage adjusting circuit.

An embodiment of the voltage adjusting circuit according to the present invention is now described with reference to the drawings. FIG. 1 is a left side view of a motorcycle 10 having a voltage adjusting circuit according to the invention. FIG. 2 is an electrical circuit diagram of the voltage adjusting circuit according to the embodiment of the present invention. FIG. 3 is a block diagram showing the flow of electricity in the voltage adjusting circuit.

As shown in FIG. 1, motorcycle 10 has a front wheel 11 and a rear wheel 12. An engine 13 drives rear wheel 12 and a generator 1. As shown in FIG. 2, a CDI unit 4 as a first electrical component is connected to a removable battery 3. A second electrical component, including a tail light unit having an LED tail light 5 and an LED stop light 9 both functioning as LED lamps and a stop switch 6, is connected to an over-voltage protecting circuit 7 of CDI unit 4. Other electrical components such as a head light 14, a meter 15, a front flasher 16, and a rear flasher 17 are provided. As shown in FIGS. 2 and 3, CDI unit 4 is formed with over-voltage protecting circuit 7 and a functional circuit 8.

Functional circuit 8 of CDI unit 4 boosts electric power supplied from generator 1 and charges a capacitor (not shown) in functional circuit 8. An ignition signal then makes the capacitor discharge at a burst to a primary coil of an ignition coil (not shown). Thereby, a high voltage is applicable to the primary coil of the ignition coil. The number of turns of the primary coil of the ignition coil thus is reduced to accelerate a speed of induction of a voltage in a secondary coil.

Because semiconductors such as thyristors may be employed in functional circuit 8, an over-voltage may damage functional circuit 8. Rectifier/regulator 2 is a voltage supply control section that controls a power amount generated by generator 1 so as to prevent an over-voltage from being generated.

However, because rectifier/regulator 2 detects a battery voltage to control the power amount generated by generator 1, if motorcycle 10 is used with battery 3 removed, rectifier/regulator 2 cannot sufficiently function and over-voltage may be applied to functional circuit 8. Therefore, CDI unit 4 is provided with over-voltage protecting circuit 7 so that electric power with a stable voltage is supplied to functional circuit 8.

Wirings supply electric power to LED tail light 5 through over-voltage protecting circuit 7. Because the LED forming LED tail light 5 is a semiconductor, it may also be damaged if over-voltage is applied thereto. However, since power is supplied through over-voltage protecting circuit 7, such damage is avoided.

When motorcycle 10 is used with battery 3 mounted, as shown in FIG. 3(a), generator 1 generates electric power and rectifier/regulator 2 rectifies the power and voltage thereof to supply the power to CDI unit 4 and LED tail light 5, while charging battery 3. Power is thereby stably supplied from rectifier/regulator 2 to CDI unit 4 and LED tail light 5 with no over-voltage conditions.

When engine 13 is started with battery 3 removed, as shown in FIG. 3(b), power is supplied from rectifier/regulator 2 to CDI unit 4 without any charge function to the removed battery 3, and also is supplied to LED tail light 5 through over-voltage protecting circuit 7. Thus, over-voltage protecting circuit 7 protects LED tail light 5 from over-voltage conditions. That is, even though motorcycle 10 is used with battery 3 removed, damage to electrical components having no over-voltage protecting circuit such as LED tail light 5 is prevented, thereby improving reliability of the electrical component without increasing cost.

Other Embodiments

Although the second electrical component having no over-voltage protecting circuit has been described as formed with LED tail light 5, other electrical components with no over-voltage protecting circuit may be employed. For example, if rear flasher 17 using an LED lamp is connected to over-voltage protecting circuit 7, the same action and effect is obtained.

Also, the first electrical component having over-voltage protecting circuit 7 has been described as formed with CDI unit 4 that controls ignition of engine 13. However, if an LED lamp of front flasher 16 or a pilot lamp (not shown) of meter 15 as the second electrical component is connected to an over-voltage protecting circuit of another first electrical component, for example, meter 15, the same action and effect is obtained.

The particular embodiments of the invention described in this document should be considered illustrative, rather than restrictive. Modification to the described embodiments may be made without departing from the spirit of the invention as defined by the following claims.

The invention claimed is:

1. A voltage adjusting circuit comprising:
 an engine;
 a generator driven by the engine;
 a power supply control section for rectifying electricity outputted from the generator and for regulating voltage thereof;
 a battery detachably connected downstream from the power supply control section;
 a first electrical component having an over-voltage protecting circuit that is connected to and receives electrical power from the power supply control section; and
 a second electrical component having no over-voltage protecting circuit, wherein electrical power is supplied to the first electrical component and the second electrical component from the generator through the power supply control section when the battery is connected,
 wherein the second electrical component is connected to and receives electrical power from the over-voltage protecting circuit of the first electrical component, and
 wherein the electrical power is supplied to the first electrical component and the second electrical component from the generator through the power supply control section when the battery is removed.

2. The voltage adjusting circuit according to claim 1, wherein the first electrical component includes a CDI unit for controlling ignition of the engine.

3. The voltage adjusting circuit according to claim 2, wherein the CDI unit includes a functional circuit that boosts electric power supplied from the generator.

4. The voltage adjusting circuit according to claim 1, wherein the second electrical component includes an LED lamp.

5. The voltage adjusting circuit according to claim 4, wherein the LED lamp includes an LED tail light.

6. The voltage adjusting circuit according to claim 5, wherein the LED lamp further includes an LED stop light.

7. The voltage adjusting circuit according to claim 4, wherein the second electrical component further includes a stop switch.

8. A motorcycle comprising:
a voltage adjusting circuit, comprising:
an engine;
a generator driven by the engine;
a power supply control section for rectifying electricity outputted from the generator and for regulating voltage thereof;
a battery detachably connected downstream from the power supply control section;
a first electrical component having an over-voltage protecting circuit that is connected to and receives electrical power from the power supply control section; and
a second electrical component having no over-voltage protecting circuit, wherein electrical power is supplied to the first electrical component and the second electrical component from the generator through the power supply control section when the battery is connected,
wherein the second electrical component is connected to and receives electrical power from the over-voltage protecting circuit of the first electrical component, and
wherein the electrical power is supplied to the first electrical component and the second electrical component from the generator through the power supply control section when the battery is removed.

9. The motorcycle according to claim 8, wherein the first electrical component includes a CDI unit for controlling ignition of the engine.

10. The motorcycle according to claim 9, wherein the CDI unit includes a functional circuit that boosts electric power supplied from the generator.

11. The voltage motorcycle according to claim 8, wherein the second electrical component includes an LED lamp.

12. The voltage adjusting circuit according to claim 11, wherein the LED lamp includes an LED tail light.

13. The voltage adjusting circuit according to claim 12, wherein the LED lamp further includes an LED stop light.

14. The voltage adjusting circuit according to claim 11, wherein the second electrical component further includes a stop switch.

* * * * *